UNITED STATES PATENT OFFICE.

ABRAHAM E. HORN, OF NEW YORK, N. Y.

METHOD OF RENDERING CONCRETE RESISTANT TO MOISTURE.

1,255,116.      Specification of Letters Patent.      Patented Jan. 29, 1918.

No Drawing.      Application filed October 20, 1917. Serial No. 197,617.

*To all whom it may concern:*

Be it known that I, ABRAHAM E. HORN, a citizen of the United States, residing in New York, in the county of New York and State of New York, have invented certain new and useful Improvements in Methods of Rendering Concrete Resistant to Moisture, of which the following is a specification.

This invention relates to the field of waterproofing concrete and similar cement aggregates and relates especially to an improvement in the art of waterproofing such normally water-pervious structural material through the agency of a compound of organic acid material with ammonia or similar volatile alkali body.

Heretofore it has been customary in this field to make use of water insoluble soaps of the nature of stearate of lime and the like, to which the objection has been raised that the bonding action of the concrete is weakened by the presence of such material. Possibly such weakening effect as has been observed through the use of stearate of lime or similar insoluble soaps has been due to a sort of lubricating action resulting from the presence in the mass of the concrete of fatty material or bodies of a lubricating character, either present in the original stearate in form of hydrocarbons, or else, possibly resulting from the action of aging on such soap. In the production of stearic acid by the distillation process, according to which a considerable amount of stearic and oleic and similar fatty acids are refined, reactions may take place, giving rise to the production of hydrocarbons which do not combine with the lime present and which therefore remain in free state to exert a lubricating action when the concrete is subjected to forces of compression. Thus concrete containing these lubricating hydrocarbons would tend to show weaknesses more readily than one free from these bodies and such conclusion appears to be borne out in practice. A further possibility is that the oxidation and other changes taking place in these fatty acids present in the concrete will split off hydrocarbon bodies or bodies of a lubricating nature, having like action.

The hardening of cement or concrete aggregate was formerly ascribed to the formation of crystalline bodies which interlace and form a mat. Hardening, is however, more likely due to the formation of colloidal bodies. The hydrated silicious matter which forms on contact of cement with water is undoubtedly of a colloidal character, being what is known as a hydrosilicate or zeolitic body, and the setting and hardening of cement may be ascribed to the solidification and densification of this colloidal material, that is to say, the conversion of the silicious hydrosol into a hydrogel, resulting in the initial set followed by a slow densification accounting for the final set. In any case the presence of ordinary lime in such waterproofing material added in a powdered form to the concrete mass apparently has the tendency to impair the binding quality to a considerable extent.

In the field of colloidal chemistry it is known that a colloid has the property of adsorbing or combining with, in some physical or loose chemical manner, other colloidal bodies. When a concrete mass forms colloidal hydrosilicates it would be, therefore, in a condition to adsorb any colloidal body present. In the present invention advantage preferably is taken of this colloidal adsorbing phenomenon to avail of a weak combination between a colloidal waterproofing agent and some portion of the colloidal hydrosilicates formed in the setting of the cement.

Specifically, the invention is concerned with certain ammonium compounds of resinic or resinous and fatty acids and particularly to certain complexes obtained by saponifying resinic and fatty acids, preferably simultaneously, with ammonia or similar volatile alkali. In this way it is possible to obtain molecular complexes made up from, for example, of the acids of ordinary rosin or colophony, stearic or oleic acid and ammonia. In place of ordinary rosin, the resins of a harder nature may be used, including the resin acids of Manila and other copals, and the like. Stearic acid admixed with palmitic acid may also be employed, preferably employing stearic acid substantially free from lubricating hydrocarbons. If more than a trace of lubricating hydrocarbons be present, such material should not be used in preparing the preferred product of the present invention. In the case of the rosin material, a high acid number or high content of resin acid is not so important as the unsaponifiable matter in the case of rosin material does not exert the same effect. In fact the product obtained by contact of the product of the present invention with the alkali of concrete has a decidedly favorable action on the strength of concrete, due no doubt to the particular peculiar colloidal conditions obtained. In tests which I have made the strength of concrete has been increased to a very desirable extent by the action of this waterproofing material.

In place of ammonia, it is possible to use in whole, or in part at least, other volatile alkalis, having the same reactive qualities, including some of the volatile amins. Preferably resin acid and stearic acid should be used in molecular proportions and ammonia may be added in equivalent amount, or an excess may be employed if desired. Preferably, however, I employ a lesser amount of ammonia than is actually required to combine with all the resinic and fatty acid present. When ordinary rosin is dissolved in ammoniacal solution, having present approximately sufficient ammonia to completely combine with the rosin acid and with enough water also present to afford a syrupy or viscous mass, it will be found under the proper conditions that ordinary rosin will dissolve in this body, although ammonia is lacking to combine with it. As the ammonium radical and the normal acid of rosin are both monovalent, it is difficult to explain this action on the ground of formation of a basic body and it is probable that the rosin goes into solution as a hydrosol due to the colloidal activity of the pre-formed ammonia resinate. Thus, a considerable proportion of apparently free rosin may be placed in solution in such a composition without producing a thick unworkable mass and this apparently free rosin has certain properties which render the composition highly useful in the waterproofing of concrete.

In the first place less ammonia is required in the composition and thus there is a saving in the cost of manufacture. In the second place there is less ammonia to be liberated on contact with the concrete mass which also is beneficial as the setting time of the cement is thus not likely to be unfavorably influenced, and in the third case there is present rosin, in an active form, which is capable of what appears to be a direct adsorption with the colloidal hydrosilicates forming a mass of utmost complexity, having water shedding or water resisting properties of a remarkably satisfactory character, while at the same time not affecting the strength of the concrete in an undesirable way, and in fact on the contrary acting rather to give the concrete a greater strength. The rosin material apparently has the further desirable action of protecting the stearic compounds formed, from undesirable changes, leading to the production of lubricating hydrocarbons, and the like, to ultimately cause a loss in compressive strength of the concrete.

As I have stated in my Patent No. 1,088,022 issued Feb. 24, 1914, relating to the use of ammoniacal compounds of stearic acid, my investigations and observations at that time led me to the conclusion that there was a reaction existent tending to augment the waterproofing effect normally existing, such reaction being due in part to the formation of complex stearates of silico- and alumino-stearates of lime, magnesium and iron, all depending on the nature of the cement and aggregate and other conditions not then indicated. My further investigations have brought me to the conclusion that the use of resin combinations with ammonia, preferably with stearic acid or similar fatty acid, although such fatty material may be omitted under some circumstances, brings about reactions not necessarily of a strict chemical nature but rather due to colloidal adsorption and in this respect it appears that the resinous compounds are much more active than the fatty compounds in bringing about or favoring the production of colloidal adsorption products.

The composition employed in the present invention may be made in the proportions described, preferably employing an excess of rosin over the amount of ammonia present to secure the effect of free rosin in aqueous solution under the conditions of the present invention. Such material may be made up as a solution of any desired strength which may be incorporated with the water used in making the concrete, and as soon as contact with the cement results, reactions begin, tending to produce the waterproofing body or colloid herein noted. It is probable that ammonium resinate acts as an accelerator for colloidal development in the concrete and in this respect has a specific waterproofing action. It would be possible to produce a highly waterproof concrete if cement could be treated to develop a sufficient amount of colloidal silicious material. Such colloidal material tends to render the concrete more and more impervious, depending on the amount of the colloidal matter present. Ammonium resinate, as stated, apparently has the specific effect of accelerating colloidal development and also bringing about a greater production of colloidal silicious material than is normal to Portland cement, so that a degree of imperviousness is obtained in this manner which is highly beneficial.

A further feature of the invention is the fact that in making up concrete masses it is not necessary to use so large an amount of water as is employed when using some waterproofing preparations. It is of course, necessary to produce a concrete that can be handled readily with the spade or will slide freely down chutes and consequently water must be added until the consistency is satisfactory for such purpose. On the other hand the addition of excessive amounts of water to concrete weakens it greatly. Enormous variations in the strength of concrete are observed, due to the fact that the water content has been widely varied. In the present case my observations indicate that considerably less water may be used to produce a body having the proper plasticity and mechanical handling qualities so that the objection of required use of excessive amounts of water in the case of some waterproofing bodies does not obtain in the present invention. By thus keeping the water within the limits necessary to secure a workable mass, an increase in compressive strength of 1½% or more has been obtained.

Many waterproofing agents seek to fill the voids of the concrete in some manner, which is practically an impossibility. All that can be expected in concrete masses containing the usual amount of aggregate is to line the capillaries with a water-repellent substance which increases the frictional resistance of the water in its efforts to penetrate the mass. pre-formed soaps such as calcium stearate in powdered form do not avail to the fullest extent in lining capillary passages, while a waterproofing agent properly formed in the mass does have this tendency, and in the present invention where a product of a colloidal nature is present and therefore having the tendency to be adsorbed by other colloidal bodies, the lining of the capillaries with a waterproofing substance is obtained in a high degree, while in the cement the release or generation of a greater proportion of colloidal hydrosilicates, or what may be termed "mineral glue" by the colloidal developing action of the resinous body leads to maximum efficiency and low cost in waterproofing operations.

The amount of resinate or ammonium resino-stearate, as it may be termed, calculated to an anhydrous basis, which may be added to the concrete mass is approximately ½% to 2%, and generally speaking, 1% is sufficient for the purpose.

The foregoing description involves terms which are given for illustrative purposes only and I do not wish to be limited by such specific discussion. The invention embraced herein is expressed by the appended claims. For example, although I have mentioned raw materials, such for example, as stearic acid, derived from some specific source, it should be understood that I am not limited to materials derived in that manner but may use any raw substances or materials serving as equivalents for those mentioned herein in an illustrative manner.

What I claim is:—

1. The process of waterproofing concrete which comprises adding thereto a solution comprising ammonium resinate.

2. The process of waterproofing concrete which comprises adding thereto a solution comprising ammonium resinate and an excess of rosin dissolved therein.

3. The process of waterproofing concrete which comprises adding thereto a solution comprising ammonium resino-stearate.

4. The process of waterproofing concrete which comprises adding thereto a solution comprising ammonium resino-stearate with free rosin dissolved therein.

5. In the process of waterproofing concrete, the step which comprises reacting on the colloidal hydrosilicates of Portland cement with a colloidal solution of ammonium resinate.

6. In the process of waterproofing concrete, the step which comprises reacting on the colloidal hydrosilicates of Portland cement with a colloidal solution of ammonium resino-stearate.

7. In the process of waterproofing concrete, the step which comprises reacting on the colloidal hydrosilicates of Portland cement with a colloidal solution of ammonium resinate and stearate, free from lubricating hydrocarbons.

8. In the process of waterproofing concrete, the step which comprises reacting on the hydrosilicates of Portland cement with a solution comprising ammonium resinate.

9. In the process of waterproofing concrete, the step which comprises reacting on the silicious matter contained in the cement with an ammoniacal compound of a resin and a fatty acid.

10. In the process of waterproofing concrete, the step which comprises incorporating ammonium resinate therewith.

11. In the process of waterproofing concrete, the step which comprises incorporating therewith a solution containing an ammoniacal compound of a resin.

12. In the process of waterproofing concrete, the step which comprises adding thereto a compound comprising a resinous body and a volatile alkali.

13. The process of waterproofing concrete, which comprises adding thereto an accelerator of the formation of colloidal hydrosilicates, said accelerator containing a compound of rosin and ammonia.

14. The process of waterproofing concrete which comprises adding thereto an accelerator of the formation of colloidal bodies present in Portland cement, said accelerator containing a compound of rosin and ammonia.

ABRAHAM E. HORN.